United States Patent Office 3,565,458
Patented Feb. 23, 1971

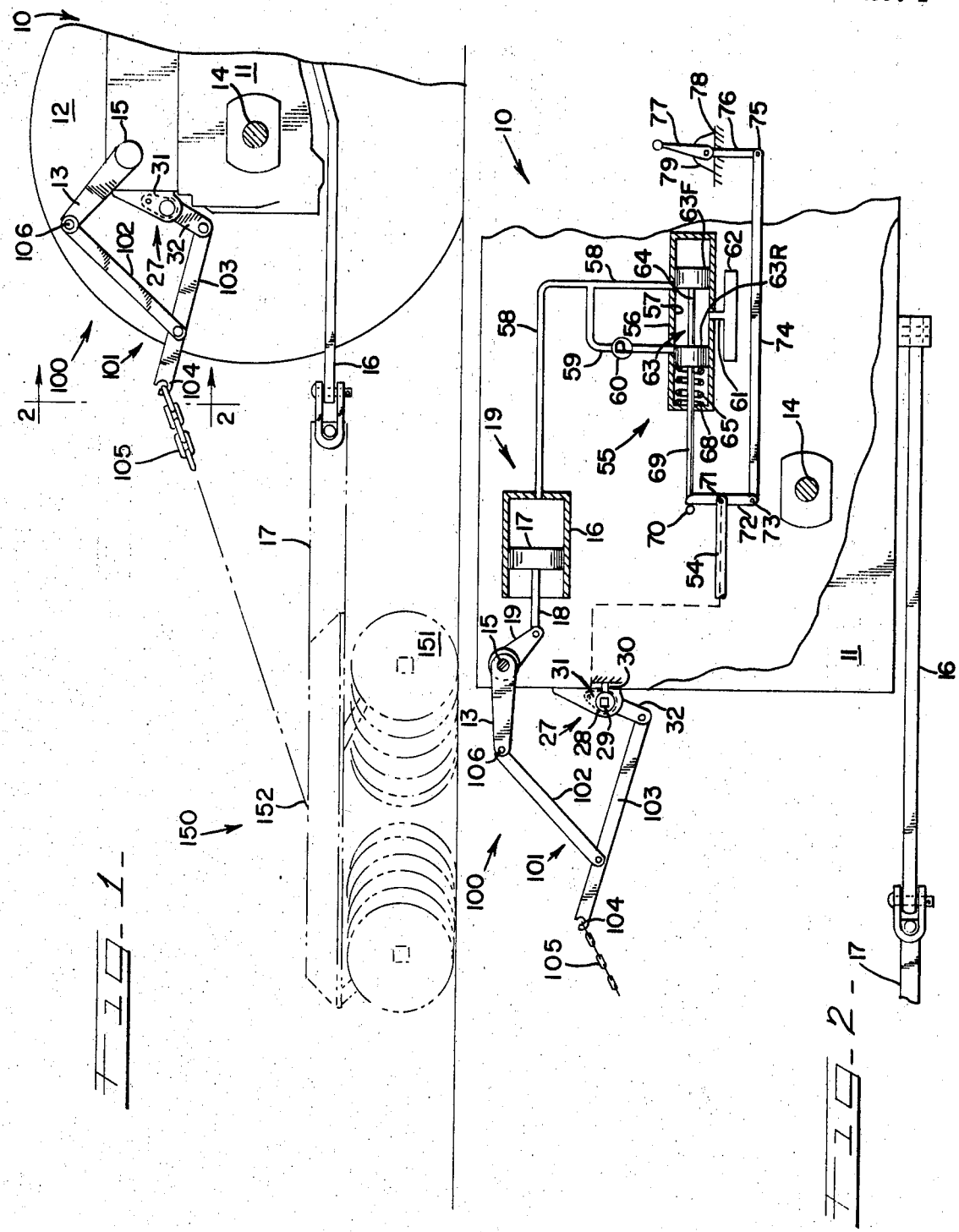

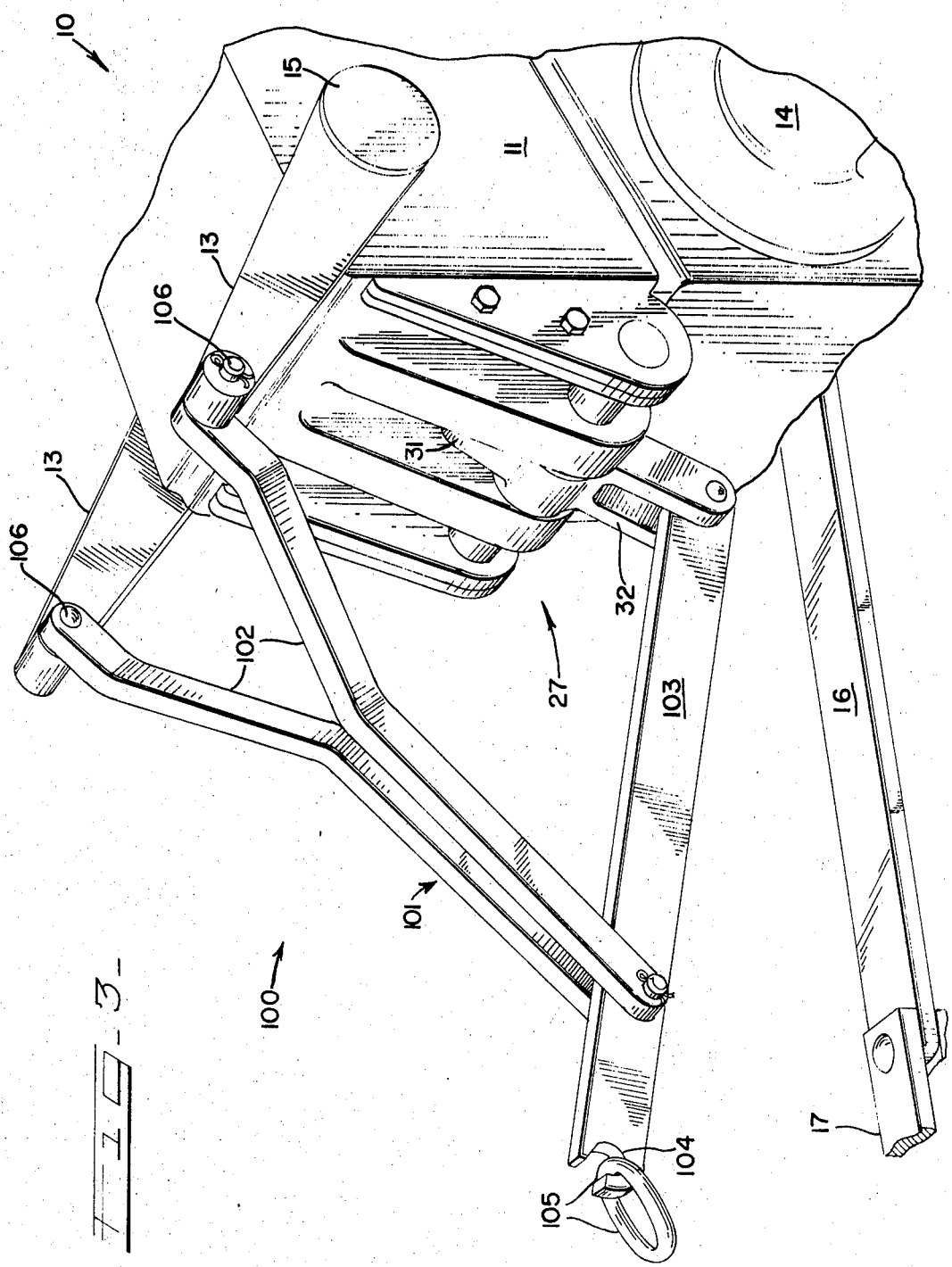

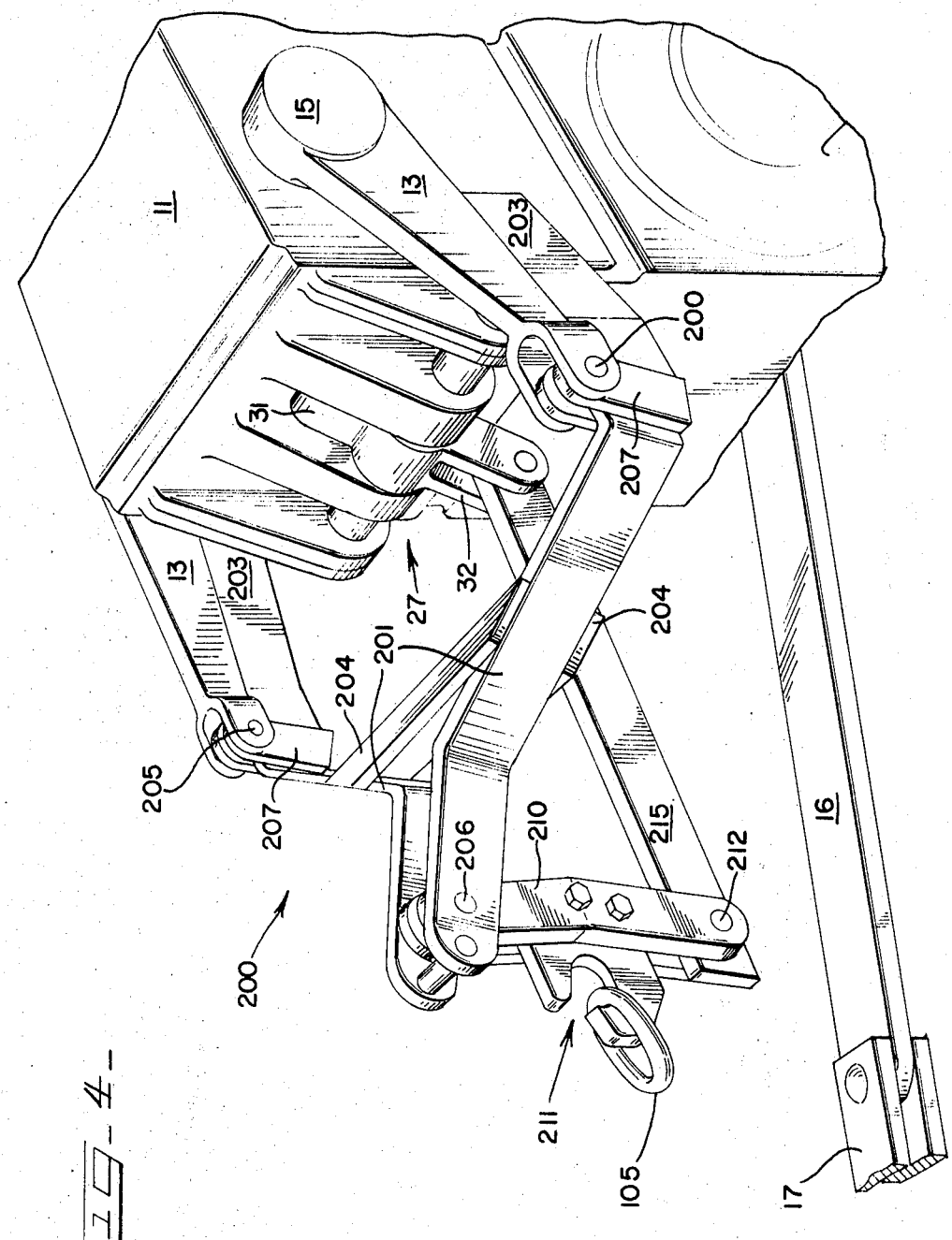

1

3,565,458
WEIGHT TRANSFER HITCH
Leonard A. Bettin, Lyons, Ill., assignor to International Harvester Company, Chicago, Ill., a corporation of Delaware
Filed June 3, 1968, Ser. No. 733,984
Int. Cl. B62d 53/00
U.S. Cl. 280—405                    8 Claims

ABSTRACT OF THE DISCLOSURE

A weight transfer apparatus for transferring weight from an attached trail behind device to a tractor having draft control means including power lift means and draft sensing means for transmitting a signal to the power lift means to operate the latter in response to actuation of the draft sensing means, the apparatus including a tension member and lifting member interconnected between the trailing device and the draft sensing means.

BACKGROUND OF THE INVENTION

This invention relates to an apparatus for transferring weight from a trail behind device to tractor. Such a weight transfer device has the primary purpose of providing a maximum tractive effect for the tractor so as to avoid slippage and spinning of the tires due to the soil or terrain conditions or to large draft loads. Such devices are designed to apply a vertical lift force upon the trail behind device thereby imparting a downward force upon the tractor and have for an object to maintain a substantially constant downward force upon the tractor. The prior art would disclose several devices which will accomplish the aforesaid function many of which are difficult to attach to the vehicle and require an excessive amount of time to do so. Further some of these devices have a complicated structural design making them very costly to fabricate. Therefore, a weight transfer apparatus which is simple to manufacture, capable of accepting all of the structural forces imposed thereon and most easily adapted or attached to the tractor is therefore highly desirable. Another object is to provide a weight transfer apparatus for a tractor which will permit the transference of a predetermined amount of weight from the trailed equipment to the tractor.

DESCRIPTION OF THE DRAWINGS

The manner in which these and other objects of this invention are attained will be made clear by consideration of the following specification and claims when taken in conjunction with the accompanying drawings in which:

FIG. 1 is an elevational view disclosing the apparatus attached to a tractor and to an implement in its operational condition;

FIG. 2 is an elevational view disclosing the instant invention in association with the draft control unit of the tractor, the draft control being shown diagrammatically;

FIG. 3 is a perspective view of the apparatus attached to the housing of a tractor; and FIG. 4 is a perspective view of an alternative embodiment of the apparatus.

DETAILED DESCRIPTION

As shown in FIG. 1 a preferred embodiment of my weight transfer apparatus 100 is disclosed in association with a tractor 10 having a drawbar 16 for attaching draft bar 17 of an implement 150 thereto, said implement having ground-engaging tools 151. The tractor 10 is conventionally provided with a rear housing 11 through which the main axle 14 passes with one of the wheels 12 being mounted thereon. Exteriorly of the rear housing 11 are lift arms 13, 13 only one of which is here shown attached to a rockshaft 15 which passes through the housing and is splined to each lift arm 13 on opposite sides thereof. The power lift arms 13, 13 operate through depending arms 102, 102 of the instant invention to raise and lower a link member 103 so as to maintain relatively constant tension in tension means 105 shown here as a chain.

Controlling the vertical position of the lift arms 13, 13 is a conventional draft control assembly, an example of which is more fully disclosed in U.S. Pat. No. 3,241,620 issued to A. Brudnak, Jr. (It should be appreciated however that the instant invention may be employed with tractors having different draft control systems.) For further clarity this system will be briefly described here and such comprises three basic assemblies; a sensing unit or lever assembly 27 an actuating means 55 and a power lift unit 19.

The sensing unit 27 (shown diagrammatically) is attached to the rear axle housing 11 and comprises a lower lever member 32 and an upper lever member 31 diametrically attached to a torsion bar 29 by tubular connection 28. A tension force operating on lower member 32 will create a clockwise movement in lower lever member 32 and upper member 31 about torsion bar 29 which movement is resisted by an anchoring member 30. This clockwise movement of the lever assembly 27 is transferred to the actuating means 55 by a pushrod 54. For further details of this assembly, reference may be made to the above cited patent.

The actuating means 55 may include a valve housing such as 56 carried by tractor frame 10 within the housing 11. The valve housing 56 defines an interior chamber 57 connected for fluid communication by way of conduit 58 with a cylinder 16 and by way of conduit 59 through hydraulic pump 60. A further conduit 61 connects said chamber with a fluid reservoir 62. Operating within the interior chamber 57 is a piston 63 having a forward portion 63F and a rearward portion 63R, with a rod 64 connected therebetween. A biasing spring 65 positioned between the end of piston portion 63R and approximate end 68 of housing 56 provides a means for positioning the piston 63 and serving to locate the respective piston portions 63F and 63R such that they will normally overlie and close the openings from the respective conduits 59 and 58 thereby preventing the entrance or release of fluid to or from the ram cylinder 16. The piston assembly 63 has a connecting rod 69 connected thereto which extends through the proximate end 68 of the housing 56 and has a transversely extending pin 70 at the rearward end thereof for engagement with one end of a link 72.

The sensing control or push rod 54 is pivotally connected at its forward end 71 to link 72 intermediate the ends thereof. The opposite end of link 72 is pivotally connected to a member 74 at 73 which is similarly pivotally connected at its opposite end by a pivot 75 to an arm 76 that represents an extension of control handle 77. Control 77 is in turn suitably mounted at 78 to a quadrant sector 79 mounted on the tractor frame 10.

This actuation means 55 directs fluid to and from the power litf unit 19 which comprises a cylinder 16, a piston 17 operating therein, a piston rod 18 operating upon crank arm 19 which raises and lowers lift arms 13, 13.

To a conventional draft control assembly such as has been herein described is attached a preferred embodiment of applicant's novel weight transfer apparatus. As disclosed in FIGS. 1 and 2 the apparatus comprises a frame 101 which has a link member 103 in the form of a rigid rod or bar attached to lower lever arm 32 of the sensing unit 27 of the draft control assembly. Intermediate the ends of link member 103 is attached a V-shaped frame member having two arms 102, 102 depending from a pivotal connection 106 with lift arms 13, 13. Attached to the rear end of link member 103 is a tension member or chain 105 which is connected to link 103 by hook 104. The tension means 105 then extends rearwardly and is attached to the implement at 152. It will be appreciated that the tension member 105 might extend from and be attached directly to lower lever member 32 of the sensing unit 27 with the depending arms 102, 102 being attached to the tension member at the point at which they are now attached to the link member 103. Further the specific form of the lifting means 102, 102 is unimportant as long as a vertical force may be imparted to the tension member 105. Consequently this embodiment discloses a most unique and simple arrangement for effective weight transfer the operation of which will be later explained.

A somewhat similar but alternative embodiment of the frame member for the weight transfer apparatus is disclosed in FIG. 4 and it comprises a frame 200 having lift arm extension members 201, 201 shaped in the form of a Y and having their forward ends connected by bracket members 207, 207 at 205, 205 to the lift arms 13, 13 with extensions 203, 203 extended forward of this connection underneath the lift arms 13, 13 and in abutting relation thereto. Cross bars 204 may be attached between the extension members 201, 201 to provide rigidity thereto. The rearward end of the extension members 201, 201 are then joined together by a pivot pin 206 extending therethrough and supporting a vertical lift element 210 which in turn has a hook means 211 rigidly attached thereto by bolts or other conventional means and adapted for attachment of the tension member 105. Attached to the lower end of this vertical lift element by a pivotal connection 212 is a link member 215 which extends forwardly for a pivotal attachment to the lower lever member 32 of sensing unit 27.

This frame means functions substantially similar to that previously disclosed in FIGS. 1 through 3 and it may be more suitable for transmitting the tensile force in the tension means 105 to the draft sensing unit 27 under certain circumstances. For example, if link 103 is raised to its maximum height, the tension force in chain 105 may be transferred to the tractor through lift links 102 rather than through the link 103 thus reducing the forces acting on torsion bar 29 and the response of the draft control system. Of course other forces operate in link 103 even though the tensile force is reduced but these are relatively minor. This alternative embodiment is designed to insure that a rearward force is always exerted against lower lever member 32.

MODE OF OPERATION

Concerning the embodiments of FIGS. 1-4 the operator of the tractor may merely rotate control lever 77 counterclockwise so as to rotate link member 72 about pivot point 71 thereby moving piston 63 to the rear and opening communication from the tank 62 through the pump to the power lift unit 19. Hydraulic fluid will then be directed to the cylinder 16 so as to expand the chamber therein causing the lift arms 13, 13 to raise. As these arms are elevated it will be observed that the tension means 105 will be placed in a tensile condition, and a rearward horizontal force is directed against lower lever member 32 of the draft sensing unit 27 and will tend to rotate levers 31 and 32 in a clockwise direction. As this rearward horizontal component of the tensile force in chain 105 increases to the point corresponding with the setting of control lever 77 this force will overcome the torsional resistance of trosion bar 29 and lever 31 will be moved clockwise so as to move pushrod 54 to the right. The movement of pushrod 54 to the right will return the valve 55 to the neutral position piston 63 then preventing communication between tank 62 and pump 60. It will be observed that at this point a vertical force also exists in tension member 105 and this vertical component is lifting upward upon the implement 150 and consequently a downward force is directed upon the wheel 12 of the tractor. Consequently an amount of weight has been transferred from the implement 150 to the tractor 10 which is proportionate to the setting of the conrol lever 77.

Assuming now that the operator of the tractor operates same over rough terrain, as the tractor moves up an incline the front wheels of the tractor will accordingly be elevated and the rearward end of link member 103 will be moved closer to the ground or to the implement and the tensile force in chain means 105 would accordingly be reduced. However, as this tensile force in chain 105 is reduced the rearward horizontal component thereof will also be reduced and such will permit torsion bar 29 to unwind about its anchor 30 with the result that upper lever member and lower lever member 31 and 32 respectively will rotate counterclockwise drawing pushrod 54 to the rear about pivot point 73. Such in turn will cause the piston 63 to move to the rear and the pump 60 will direct hydraulic fluid to the chamber 16 thus causing the power lift arms 13, 13 to raise so as to maintain a substantially constant tensile force in chain means 105.

Similarly should the tractor begin to move down an incline before the implement has reached such incline it will be appreciated that link 103 would be raised to a higher position thus tending to increase the tension in chain member 105. However such an increase in tension would also provide a greater rearward horizontal component acting against lever members 31 and 32 which in turn would cause the pushrod 54 and biasing means 68 to cause the piston to move forward and allowing hydraulic fluid to flow from the cylinder 16 to the tank 61, lowering lift arms 13, 13 and maintaining the tension in chain 105 constant.

The operation of the embodiment of FIG. 4 is identical to that of FIGS. 1 through 3 just explained but it may have a wider applicability to various tractor models since it is designed to always insure that a rearward force will be exerted against lower lever member 32 when a tensile force exists in chain 105.

Thus it will be observed that applicant has disclosed weight transfer apparatus which may be utilized with the sensing units of conventional tractors so as to transfer weight from a trailed implement to a tractor. It should be appreciated that this apparatus is extremely simple, easy to operate and most easily assembled.

As this invention may be embodied in several forms without departing from the spirit or essential characteristics thereof the present embodiment is therefor illustrative and not restrictive and since the scope of the invention is defined by the appended claims all changes that fall within the metes and bounds of the claims or that form their functional as well as conjointly cooperative equivalents are therefore intended to be embraced by those claims.

I claim:

1. A weight transfer apparatus for use with a tractor having lower links of a three-point hitch type a drawbar for attachment to the draft bar of a trail behind device, a draft control system comprising lift arms vertically controlled by a power lift unit, an actuation unit for controlling said lift unit and a sensing unit, said apparatus comprising:
   (a) frame means adapted for direct connection to the lift arms exclusive of said lower links and to the sensing unit of said draft control system for transferring a tensile force signal to said sensing unit and for vertical movement responsive to actuation of said draft control system due to said signal, and
   (b) tension means attached to a part of said frame means and adapted for connection to the trail behind device for imparting a substantially horizontal draft force through said frame means to said sensing unit and for imparting a vertical lift force upon the trail behind device through vertical movement of said frame means in response to actuation of said draft control system.

2. An apparatus as defined in claim 1 in which said frame comprises:
   (a) an elongated rod having one end attached to said sensing unit and its other end attached to said tension means, and
   (b) lifting means pivotally connected to the lift arms and pivotally attached to the elongated rod intermediate the ends thereof.

3. An apparatus as defined in claim 1 in which said frame means comprises:
   (a) extension members connected to the lift arms and extending rearwardly thereof,
   (b) a rigid link member connected at its forward end to the draft sensing means and extending rearwardly, and
   (c) a vertical link member interconnected between said extension members and said link member and having hook means thereon for attachment of said tension member.

4. In combination with a tractor having a drawbar for attaching the draft bar of a trail behind device, and a draft control system comprising a sensing unit, an actuating unit and lift arms controlled by a power lift unit, an improved weight transfer apparatus comprising:
   (a) a tension means connected to the sensing unit and adapted for attachment to the trail behind device for imparting a measure of the tensile force created therein to the sensing unit, and for exerting a vertical upward force upon the trailed device, and
   (b) a lift element coupling said power lift arms with said tension means and vertically responsive to actuation of the draft control system to create and maintain substantially constant tensile force in said tension means.

5. In a tractor-implement combination wherein the draft bar of the implement is connected in trailing relation to the drawbar of the tractor by means accommodating relative angular movement between the implement and the tractor and wherein the tractor is provided with lower draft links of the three-point hitch type a draft control system including power lift means and draft sensing means effective upon actuation thereof to operate said power lift means,
   (a) frame means directly connected between the power lift means and the draft sensing means exclusive of said lower draft links adapted to be vertically moved upon operation of the power lift means, and
   (b) a tension member connecting the implement to said frame means, said tension member being effective upon relative angular movement between the implement and the tractor to cause actuation of the draft sensing means and operation of the power lift means.

6. Apparatus as defined in claim 5, in which said frame means includes a rigid link member connected at its forward end to the draft sensing means and at its rear end to said tension member.

7. Apparatus as defined in claim 5, in which said tension member is flexible to accommodate relative vertical movement between the implement and the connection of the tension member to said frame means upon relative angular movement between the implement and the tractor.

8. An apparatus as defined in claim 5 in which said frame means comprises:
   (a) extension members connected to the power lift means and extended rearwardly thereof,
   (b) a rigid link member connected at its forward end to the draft sensing means and extending rearwardly, and
   (c) a vertical link member interconnected between said extension members and said link member and having hook means thereon for attachment of said tension member.

References Cited
UNITED STATES PATENTS

| | | | |
|---|---|---|---|
| 3,241,620 | 3/1966 | Brudnak | 172—7 |
| 3,341,224 | 9/1967 | Bultheel et al. | 280—405 |
| 3,347,560 | 10/1967 | Hodges et al. | 280—405 |
| 3,062,561 | 11/1962 | Wulff et al. | 280—405 |

LEO FRIAGLIA, Primary Examiner

U.S. Cl. X.R.

172—7